United States Patent
Lehnert et al.

(10) Patent No.: US 8,061,684 B2
(45) Date of Patent: Nov. 22, 2011

(54) ANTI-TWIST DEVICE FOR AN ACTUATING MOTOR

(75) Inventors: Frank Lehnert, Rüti (CH); Urs Niederhauser, Pfungen (CH)

(73) Assignee: Belimo Holding AG, Hinwil (CH)

( * ) Notice: Subject to any disclaimer, the term of this patent is extended or adjusted under 35 U.S.C. 154(b) by 750 days.

(21) Appl. No.: 12/281,377

(22) PCT Filed: Feb. 19, 2007

(86) PCT No.: PCT/CH2007/000081
§ 371 (c)(1), (2), (4) Date: Sep. 2, 2008

(87) PCT Pub. No.: WO2007/098620
PCT Pub. Date: Sep. 7, 2007

(65) Prior Publication Data
US 2009/0114862 A1   May 7, 2009

(30) Foreign Application Priority Data
Mar. 3, 2006  (CH) ..................................... 0342/06

(51) Int. Cl.
*F16K 31/04* (2006.01)
(52) U.S. Cl. .................... 251/129.11; 251/292; 251/305
(58) Field of Classification Search ............. 251/129.11–129.13, 292, 305–308
See application file for complete search history.

(56) References Cited

U.S. PATENT DOCUMENTS

| | | | |
|---|---|---|---|
| 1,387,715 A * | 8/1921 | Hickman | 251/90 |
| 3,318,171 A | 5/1967 | Wilkinson et al. | |
| 4,046,350 A * | 9/1977 | Massey et al. | 251/58 |
| 4,633,897 A * | 1/1987 | Effenberger | 137/315.35 |
| 5,927,682 A | 7/1999 | Gul et al. | |
| 5,967,171 A * | 10/1999 | Dwyer, Jr. | 137/78.1 |
| 6,354,322 B2 * | 3/2002 | Clark | 137/312 |
| 6,662,821 B2 * | 12/2003 | Jacobsen et al. | 137/312 |
| 6,913,034 B2 * | 7/2005 | Szafron | 137/382 |
| 7,066,192 B1 * | 6/2006 | Delaney et al. | 137/15.18 |

FOREIGN PATENT DOCUMENTS
DE  12 86 363 B1  1/1969

* cited by examiner

*Primary Examiner* — John Bastianelli
(74) *Attorney, Agent, or Firm* — Thaddius J. Carvis

(57) ABSTRACT

An anti-twist device retains an actuating motor (10), which is placed in a force-fitting and/or form-fitting manner onto the projecting driveshaft (22) of a pivotable shut-off flap (62) of a gas transport tube (34), in particular of an HVAC tube or flue gas tube for a building, in a longitudinally moveable manner. Arranged at an adjustable axial distance (a) from the driveshaft (22) is at least one clamp (36) which secures the actuating motor (10). The parallel limbs (46) of the preferably substantially U-shaped clamp (36) are of resilient design, wherein in each case one end-side, inwardly projecting latching lug (48) is formed for holding down the actuating motor (10).

10 Claims, 4 Drawing Sheets

Figure 1:
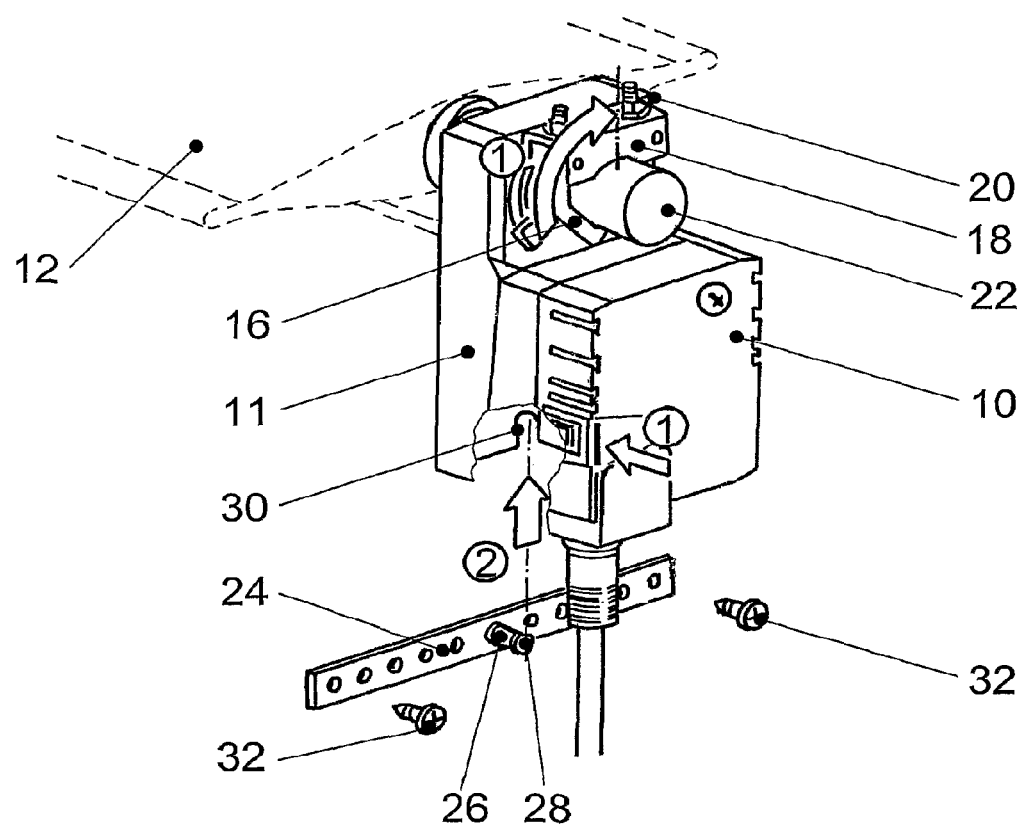

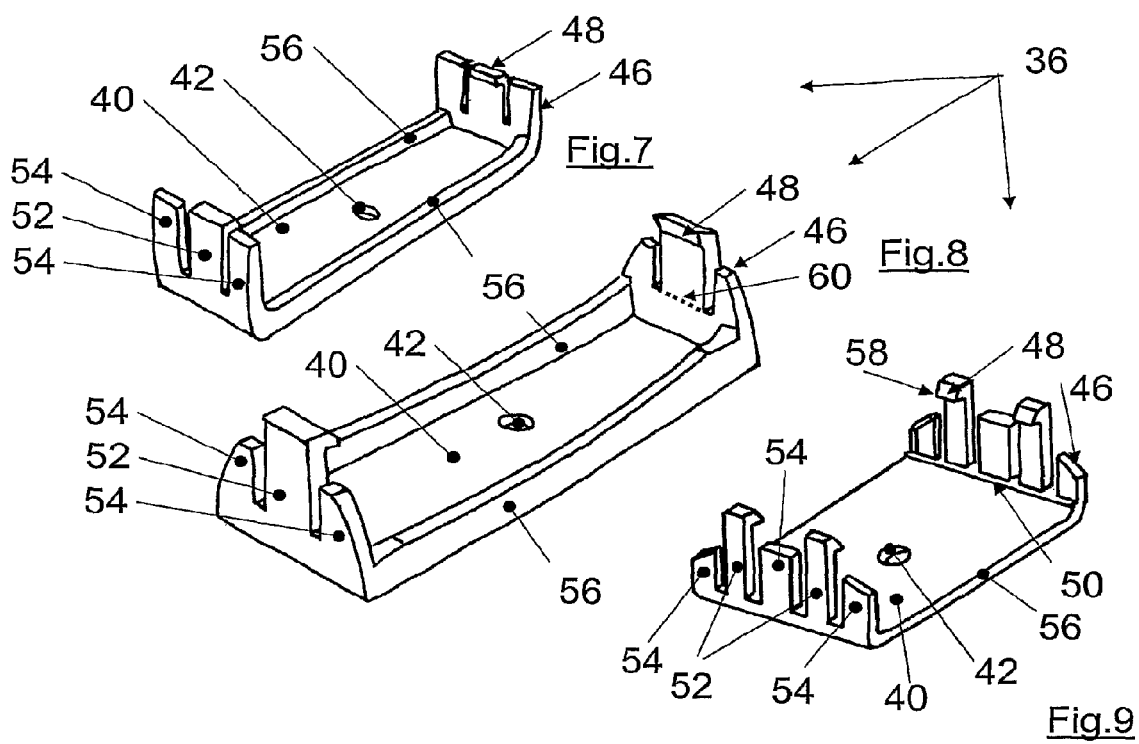
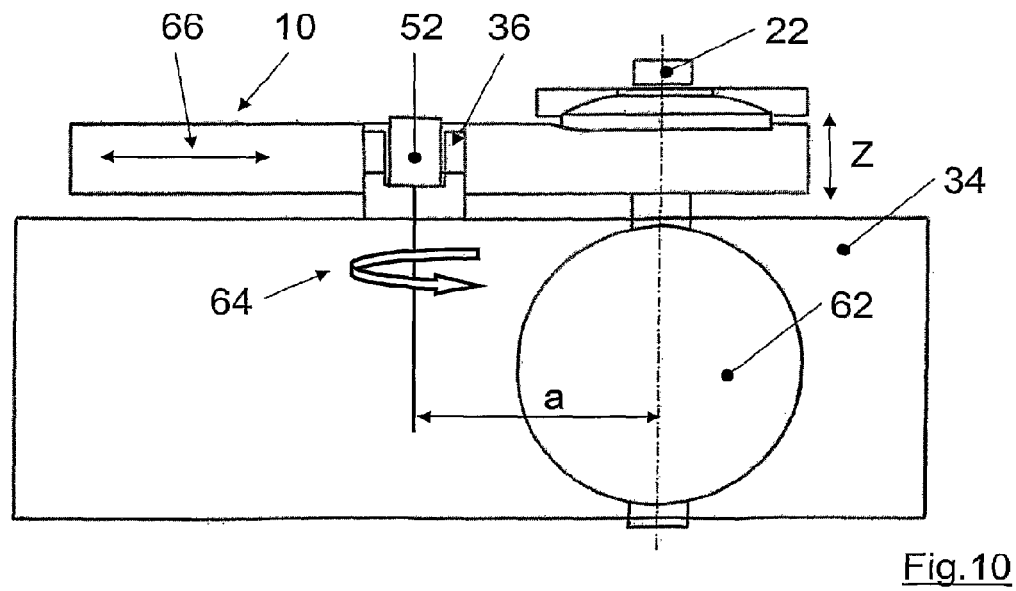

ANTI-TWIST DEVICE FOR AN ACTUATING MOTOR

The invention relates to an anti-twist device for an actuating motor which is fitted in a non-positive and/or positive manner on the projecting drive shaft of a pivotable shut-off flap of a gas transportation pipe, in particular an HVAC or flue-gas pipe of a building.

Electric actuating drives for motorizing actuators in heating, ventilation and air-conditioning systems, called HVAC systems for short, and flue-gas pipes have been produced for more than 30 years. HVAC actuators ensure economical volumetric-flow control of gases and liquids, in particular of air and water. Actuating motors generally comprise not only the drive but also pressure sensors and regulators, all combined in one device, as a compact unit.

Ventilation systems are increasingly used in buildings, in particular residential buildings, office buildings, commercial buildings and industrial buildings, generally combined with flue-gas protection devices. Volumetric-flow control with pivotable air flaps plays an essential role in ventilation systems. The volumetric flow is measured using a suitable measuring instrument, for example using the NMV-D2M from Belimo Automation AG, CH-8340 Hinwil, which forms a compact unit comprising a drive, a pressure sensor and a regulator, and the measured values are forwarded to an electronics system.

In order to pivot a flap, relatively weak motors operate regulating elements of large surface area. The actuating motor has to be prevented from twisting on account of the exerted torque. If the actuating motor is firmly mounted on the flap shaft with a force fit, it is necessary to absorb any eccentricity of the rotating flap axis, in addition to a torque. This is done using an anti-twist device which permits a corresponding linear movement in the longitudinal direction but prevents twisting of the actuating motor. To this end, an arresting pin can be pushed into a longitudinal slot of the motor housing, which is open at the single-seat end, at a distance from the drive shaft of the shut-off flap. The arresting pin is generally fixed on a stiff perforated strip which, however, can bend in accordance with the pipe diameter and for its part is screwed to the pipe.

If the drive is mounted with an interlock, the actuating motor only has to absorb the torque, but not any eccentricity; the interlock is virtually always central relative to the drive shaft of the shut-off flap. The housing of the actuating motor is screwed to the pipe and thus produces the anti-twist device. Moreover, the actuating motor is secured in the axial direction of the drive shaft. However, enough space has to be provided for turning the screws for this purpose, and in the case of round pipes the screws have to lie on the same generatrix.

The invention is based on the object of providing an anti-twist device of the type mentioned in the introduction which is simpler to mount and more flexible to handle.

According to the invention, the object is achieved in that at least one clamp which holds the actuating motor such that it can move in the longitudinal direction is arranged at an adjustable axial distance from the drive shaft. Specific and developed embodiments of the anti-twist device are the subject matter of dependent patent claims.

During mounting, the actuating motor is pushed between the limbs of the clamp, which is expediently of U-shaped design, at the same time as it is pushed onto the drive shaft of the shut-off flap, and held therein without play. However, it is of critical importance for the actuating motor to be able to move freely with respect to the radial direction of the drive shaft. As a result, any eccentricity can be compensated for.

However, the clamp also has to be stable enough to absorb the maximum possible torque of the adjusting motor without problems. When a customary force fit and/or interlock is produced between the actuating motor and the drive shaft, for example by means of a customary clamping block, the above-described retention by the clamp is sufficient.

At least a portion of the parallel limbs of the clamp is preferably of sprung design and in each case has an inwardly projecting latching lug at the end for holding down the actuating motor. A flat actuating motor is surrounded by the clamp; the latching lugs can slide on the upper face of the housing. In the case of relatively large actuating motors, a longitudinally running groove is formed in the housing on both sides in order to accommodate the latching lugs such that they can move in the longitudinal direction.

In the case of limbs of the clamp which are of entirely sprung design, these limbs nevertheless have to be able to absorb the maximum torque of the actuating motor, and secondly it also has to be possible to manually spread them without problems, so that the actuating motor can be replaced without using tools.

According to a developed embodiment, the limbs of the clamp are separated into at least one sprung part with a latching lug and at least one dimensionally stable angled part. The sprung part now no longer has to contribute to absorbing the torque. For the purpose of better handling, said sprung part can have a weakening groove at the base. Secondly, a reinforcing rib which extends away over the limbs and the base plate in an integral manner can be formed in the region of the dimensionally stable parts of the clamp.

The flexibility of the clamp according to the invention is further increased when said clamp is fixed to the pipe with only one screw or a mechanically equivalent means, for example a rivet, and therefore can pivot. A particularly interesting variant of this solution involves fixing the clamp to the pipe by means of a spreadable clip with opposing limbs and outwardly projecting latching lugs which can be pressed together for unlatching purposes. In the case of a plastic injection-molded part, this clip is integrally formed longitudinally in the center.

A clamp according to the invention permits rapid and problem-free replacement of an actuating motor. Mounting can be further simplified by the latching lugs of the limbs having a sliding surface which automatically spreads the sprung limbs of the clamp when the actuating motor is attached, and latching takes place automatically when the end position is reached.

The clamp is expediently premounted, and so the actuating motor can just be clipped in.

The clamp can be produced from all suitable materials, in particular spring steel or as a plastic injection-molded part.

The gas transportation pipe can also have a plurality of holes for attaching the clamp, which holes are arranged along a generatrix. This permits optimum positioning of the clamp in relation to the torque which occurs. The unused holes can be covered with suitable means.

The clamp according to the invention has the following advantages:
  It can absorb any eccentricity.
  Only one screw or an equivalent mechanical means for fixing the clamp to the pipe is required, for example a clip.
  The actuating motor can be mounted and removed without using a tool. The distance between the drive shaft of the shut-off flap and the clamp can be freely selected within wide limits.

No complicated recesses or fittings are required on the drive.

The actuating motor can be fitted in a positive manner, without having to be secured to the drive shaft.

A single, that is to say the same, retention means is sufficient for the interlock and the clamping block.

Figure 2:
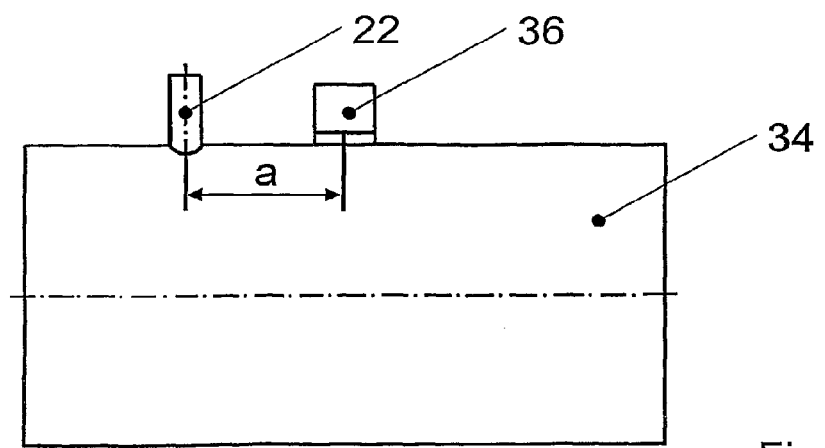
Figure 3:
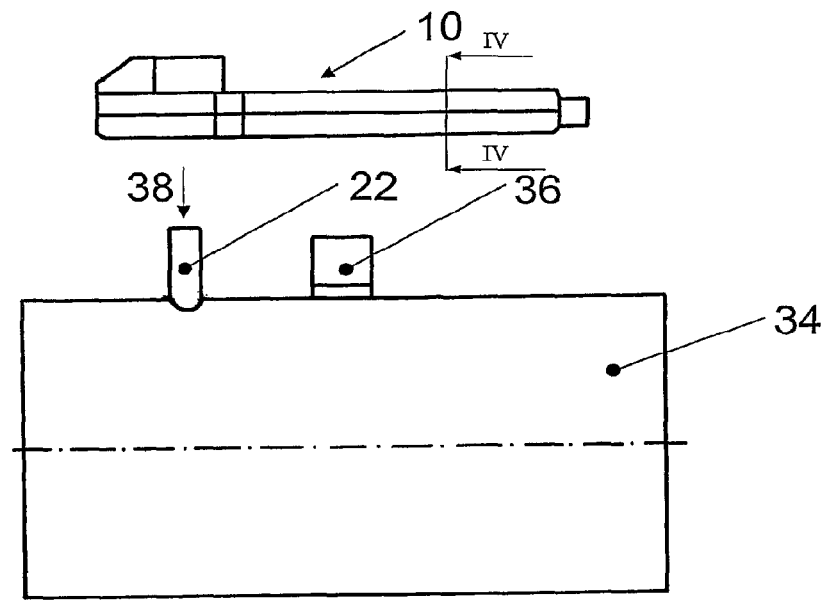
Figure 4:
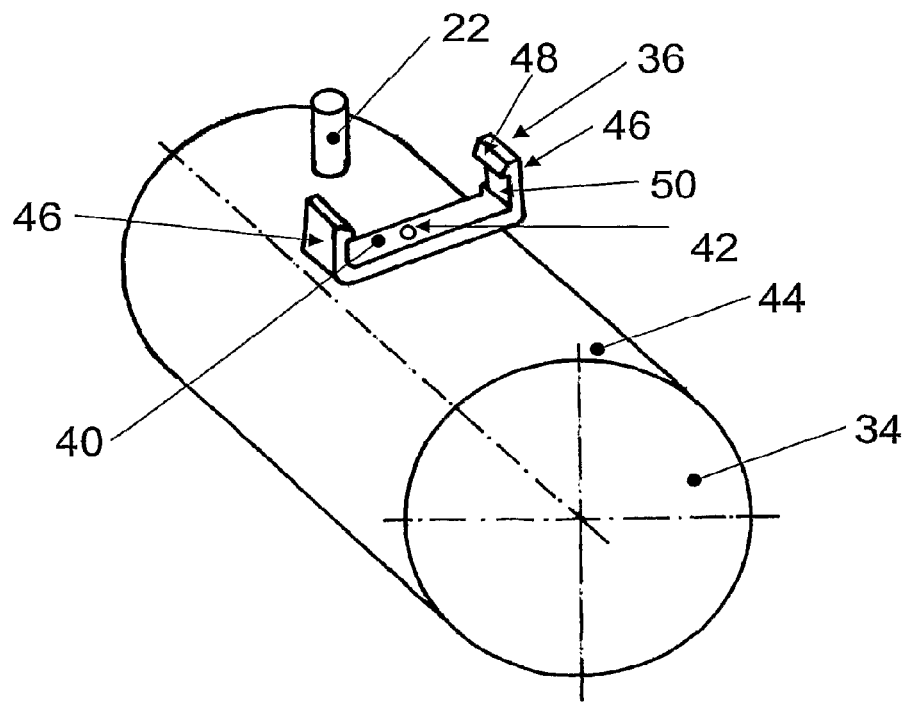
Figure 5:
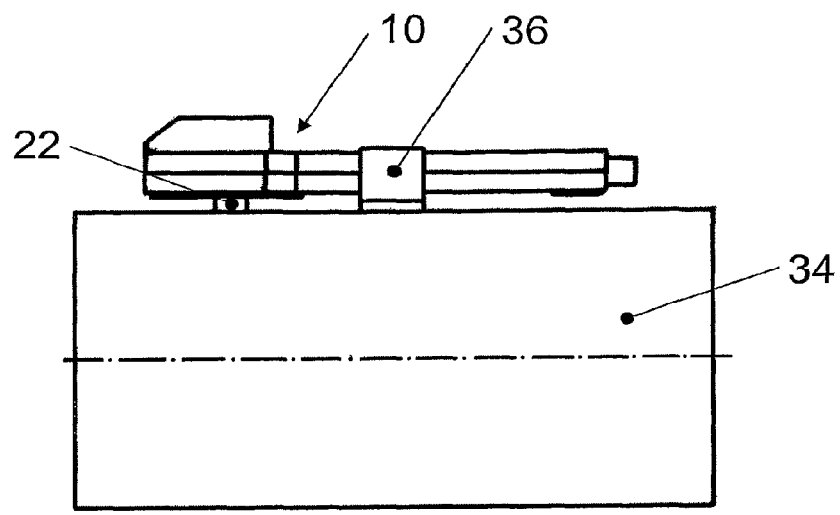
Figure 6:
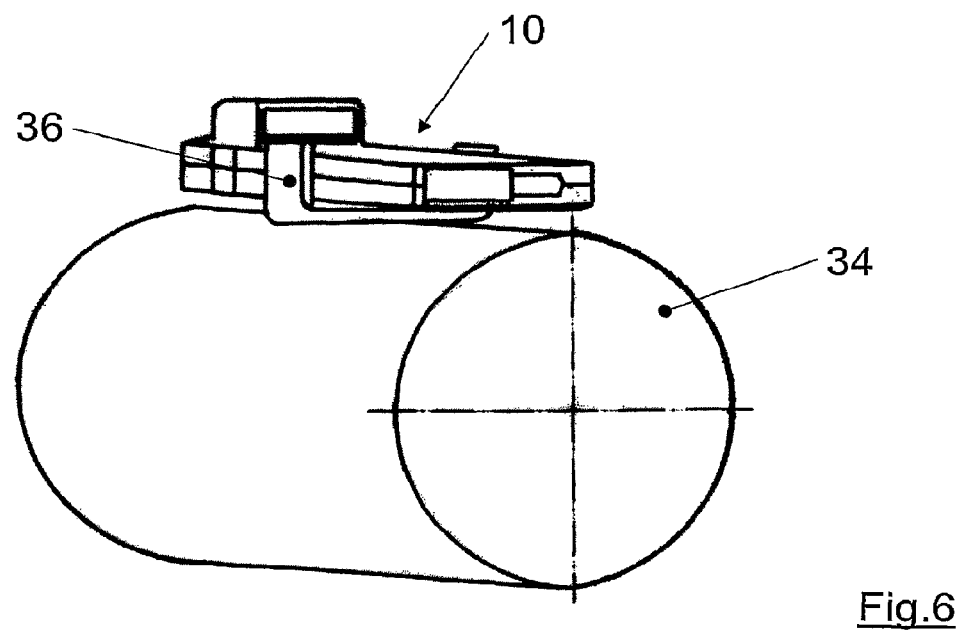

The invention will be explained in greater detail with reference to the exemplary embodiments which are also the subject matter of dependent patent claims and are illustrated in the drawing, in which:

FIG. 1 schematically shows a perspective view of an actuating motor with an anti-twist device according to the prior art, FIG. 2 schematically shows a view of a gas transportation pipe with a projecting drive shaft for a shut-off flap and a premounted clamp, FIG. 3 schematically shows a view according to FIG. 2 with an actuating motor which is ready to be mounted, FIG. 4 schematically shows a perspective illustration of FIG. 2, FIG. 5 schematically shows a view of a gas pipe with the actuating motor mounted, FIG. 6 schematically shows a perspective illustration of FIG. 5, FIGS. 7-9 schematically show perspective views of clamps, and FIG. 10 schematically shows a partially sectioned view of an arrangement according to FIG. 5.

FIG. 1 shows an actuating motor 10 with a very powerful step-down gear mechanism 11 with which a shut-off flap 12 can pivot exactly through a predefined angle. The torque is transmitted to the drive shaft 22 in a non-positive manner by means of a clamping block 14 which comprises a substantially U-shaped bracket 16, a yoke 18 and two screws 20.

As an anti-twist device, a perforated strip 24 with an arresting pin 26, which has a protruding head 28, is inserted into a slot 30 of the housing, this being illustrated by arrow (2). The stiff perforated strip 24 is anchored in a gas transportation pipe (not illustrated, but denoted 34 in FIG. 2) by means of two screws 32. The arresting pin 26 inserted into the slot 30 has virtually no play in the direction of arrow (1) when a torque is exerted. In contrast, any eccentricity caused by the force fit can be compensated for without problems at any time when the drive shaft 22 is rotated.

FIG. 2 shows a gas transportation pipe 34 with a projecting drive shaft 22 of the shut-off flap (not visible). According to the invention, a clamp 36, which is premounted in this case, is pivotably mounted. According to FIG. 3, a flat actuating motor 10 is fitted onto the projecting drive shaft 22 in a positive manner in the direction of arrow 38 and at the same time inserted into the clamp 36. The shape of the clamp 36 can be seen in FIG. 4. Said clamp 36 is of substantially U-shaped design and corresponds to the cross section IV-IV of the actuating motor 10 in FIG. 3. The clamp 36 has a stiff base plate 40 with a centered hole 42 for a single fixing screw (not illustrated for the sake of simplicity). The hole 42 is made on the same generatrix 44 as the drive shaft 22.

A clamp 36 according to FIG. 4 further comprises two slightly spreadable limbs 46 with a latching lug 48 in each case. Furthermore, support strips 50 for the accommodated actuating motor 10 are formed in the lower region of the limbs 46. FIG. 4 clearly shows that the actuating motor 10 retained in the clamp 36 can be moved in the axial direction of the gas transportation pipe 34, this being of critical importance in the case of a variant with a clamping block 14 (FIG. 1) as discussed above.

FIGS. 5 and 6 show a flat actuating motor 10 which is fitted onto the drive shaft 22 and is retained in a clamp 36.

FIGS. 7 to 9 show clamps 36 with differently structured limbs 46. In FIGS. 7 and 8, the limbs 46 comprise a sprung center part 52 with the latching lug 48 and two side parts 54 which are angled in a dimensionally stable manner. Reinforcing ribs 56 run on both sides of the base plate 40 from limb 46 to limb 46 or from fixed part 54 to fixed part 54 of the limbs 46.

In the embodiment of the clamp 36 according to FIG. 9, two relatively long sprung parts 46 and three shorter dimensionally stable parts 54 are formed as limbs 46. An inwardly and downwardly directed sliding surface 58 is formed on the latching lugs 48 of the sprung limbs 52. The actuating motor 10 can thus be fitted onto the latching lugs 48 and pressed downward. On account of the sliding surfaces 58, the sprung parts 52 spread outward and snap in when the end position on the support strips 50 is reached.

The sprung parts 52 according to FIG. 8 have a weakening groove 60 (which is illustrated by a dashed line) at the base, and as a result latching can be released more effectively.

FIG. 10 once again illustrates an overview of the invention. A shut-off flap 62 which can be pivoted by means of a drive shaft 22 is arranged in a gas transportation pipe 34.

An actuating motor 10 is fitted onto the drive shaft 22 of the shut-off flap 62 in a positive manner by means of its hollow drive shaft (not visible) and can be removed again in the opposite direction, this being indicated by the double-headed arrow z. When the actuating motor 10 is inserted, it is likewise pressed into a clamp 36, with the sprung parts 52 snapping in and fixing the actuating motor 10 in the end position. No fixing measures for the z direction have to be taken in the region of the drive shaft 22. This is done by the latching of the clamp 36.

The rotary arrow 64 indicates that the clamp 36 which serves as a retention means can be rotated; the double-headed arrow 66 indicates that the actuating motor 10 can be moved in the longitudinal direction of the gas transportation pipe 34, as a result of which any eccentricity can be absorbed.

The invention claimed is:

1. An anti-twist device for an actuating motor (10) which is fitted in a non-positive and/or positive manner on the projecting drive shaft (22) of a pivotable shut-off flap (62) of a gas transportation pipe (34), wherein
    a) at least one U-shaped clamp (36) is provided which has two spreadable limbs (46),
    b) the clamp (36) is connected to said gas transportation pipe (34) so that it is arranged at a distance (a) from the drive shaft (22),
    c) the limbs (46) hold said actuating motor (10) such that it can move in the longitudinal direction, and
    d) the limbs (46) of the clamp (36) in each case have an inwardly projecting latching lug (48) for holding down the actuating motor (10), which latching lugs (48) surround said actuating motor (10) or engage in a longitudinally running groove of said actuating motor (10).

2. The anti-twist device as claimed in claim 1, characterized in that limbs (46) are substantially parallel so that the clamp (36) is substantially U-shaped wherein the limbs (46) are of sprung design and in each case have the latching lug (48) at the end of the limbs (46) for holding down the actuating motor (10).

3. The anti-twist device as claimed in claim 1, characterized in that the limbs (46) of the clamp (36) are separated into at least one sprung part (52) with a latching lug (48) and at least one dimensionally stable angled part (54).

4. The anti-twist device as claimed in claim 2, characterized in that the sprung part (52) of the limbs (46) has a weakening groove (60) at the base.

5. The anti-twist device as claimed in claim 4, characterized in that the clamp (36) comprises at least one reinforcing rib (56) which extends away over the limbs (46) and the base plate (40) in an integral manner.

6. The anti-twist device as claimed in claim 1, characterized in that the clamp (36) is fixed to the pipe (34) such that it can pivot via a longitudinally central hole (42) by means of a single screw (32) or a rivet.

7. The anti-twist device as claimed in claim 6, characterized in that the clamp (36) is fixed by means of a clip which is arranged longitudinally in the center and has opposing limbs.

8. The anti-twist device as claimed in claim 1, characterized in that the clamp (36) is premounted.

9. The anti-twist device as claimed in claim 1, characterized in that the latching lugs (48) have a sliding surface (58), which runs obliquely inward and downward, for automatically spreading the limbs (46) of the clamp (36) when the actuating motor (10) is inserted.

10. The anti-twist device as claimed in claim 1, characterized in that the clamp (36) comprises spring steel or an elastic plastic.

\* \* \* \* \*